US007930300B2

(12) United States Patent
Colbran

(10) Patent No.: US 7,930,300 B2
(45) Date of Patent: Apr. 19, 2011

(54) ASSESSMENT OF EDUCATIONAL SERVICES

(76) Inventor: Stephen Colbran, Armidale (AU)

( * ) Notice: Subject to any disclaimer, the term of this patent is extended or adjusted under 35 U.S.C. 154(b) by 328 days.

(21) Appl. No.: 12/085,847

(22) PCT Filed: Oct. 25, 2006

(86) PCT No.: PCT/AU2006/001593

§ 371 (c)(1),
(2), (4) Date: May 30, 2008

(87) PCT Pub. No.: WO2007/062450

PCT Pub. Date: Jun. 7, 2007

(65) Prior Publication Data

US 2009/0287738 A1 Nov. 19, 2009

(30) Foreign Application Priority Data

Dec. 2, 2005 (AU) ................................ 2005906787

(51) Int. Cl.
*G06F 17/00* (2006.01)

(52) U.S. Cl. ........ 707/726; 707/729; 707/731; 707/732; 707/791

(58) Field of Classification Search .................. 707/726, 707/729, 731, 732, 791
See application file for complete search history.

(56) References Cited

U.S. PATENT DOCUMENTS

2004/0153509 A1 * 8/2004 Alcorn et al. ................ 709/205
2007/0111180 A1 * 5/2007 Sperle et al. .................. 434/350

* cited by examiner

*Primary Examiner* — Sana Al-Hashemi
(74) *Attorney, Agent, or Firm* — Wood, Phillips, Katz, Clark & Mortimer

(57) ABSTRACT

This invention concerns a web-based system comprising a server, computer storage and web-portal to provide an integrated management feedback system for the assessment of educational services. The system particularly comprises an interface to input definitions of graduate attributes related to levels of complexity; and input definitions of learning outcomes related to teaching theory which defines levels for outcomes. A database to map relationships between graduate attributes at particular levels of complexity and their related teaching methods and assessment items; and learning outcomes at particular levels and their related teaching methods and assessment items. A processor to automatically respond to the assessment results for a particular student and determine and record both the graduate attribute levels of complexity, and learning outcomes levels, achieved by that student.

17 Claims, 7 Drawing Sheets

ASSESSMENT OF EDUCATIONAL SERVICES

TECHNICAL FIELD

This invention concerns a web-based system comprising a server, computer storage and web-portal to provide an integrated management feedback system for the assessment of educational services. In another aspect the invention is computer software.

BACKGROUND ART

There are a number of web-based Learning Management Systems (LMS) designed to assist students or employees in their studies. The systems typically allow students to share documents, and manage drafts of essays, assignments and projects; all of which may take place outside of a learning institution. The systems can also be used by teachers to manage and publish learning resources, such as interactive courseware, study guides, assignments and other course learning objects or content.

However there are a number of major problems associated with assessment that are not typically addressed by current learning management systems. There is a lack of systematic management of feedback from coordinators to students and vice versa. The comments provided by teachers are usually brief and sometimes illegible, making it difficult for students to identify and learn from their mistakes. Comments for the same mistakes often lack consistency. On the other hand, feedback from students to teachers, in the forms of unit and teaching reviews, surveys, appeals and complaints, are difficult to administer. Overall, there is slowness in providing feedback.

Universities market their courses to both prospective students and employers on the basis of the attributes that graduates will possess upon completion of their course. However, current learning management systems offer poor integration and tracking of graduate attributes and learning outcomes. This hinders internal quality assurance processes and accreditation requirements.

DISCLOSURE OF THE INVENTION

The invention is a web-based system comprising a server, database and a web-portal to provide an integrated feedback management system for the assessment of educational services, comprising:

- An interface to:
  - Input definitions of graduate attributes at various levels of complexity.
  - Input definitions of learning outcomes related to teaching theory at various levels of complexity.
- A database to map relationships between:
  - Graduate attributes at particular levels of complexity and their related teaching methods and assessment items.
  - Learning outcomes at particular levels and their related teaching methods and assessment items.
- A processor to:
  - Automatically respond to the assessment results for a particular student and determine and record both the graduate attribute levels of complexity, and learning outcomes levels, achieved by that student.

The invention may further comprise:

- A database to store:
  - Teaching experiences related to graduate attributes and learning outcomes.
  - Student feedback related to courses, or course units.

- A processor to:
  - Map changes to teaching and assessment methods, both formative and summative, related to information in the database.

The mapping of graduate attributes, learning outcomes and assessments may be further facilitated by an assessment management subsystem, comprising

- An interface for coordinators to:
  - Set up assessment items, which contain information such as the title, due date, maximum marks, list of questions, answer guide and grading system.
  - Map assessment items to relevant graduate attributes and learning outcomes.
  - Input definitions of assessment rubrics, criteria highlighter and XML markup editor to be used for commenting and grading assessment items.
  - Allocate and track assessment items, or a group of questions within the assessment items, to one or more markers.
- An interface for markers to:
  - Assess the assigned assessment items using assessment rubrics, criteria highlighter or XML markup editor determined by the teacher.
  - Input comments, in text, audio, image and video format, to students.
  - Record the assessment results of the assigned assessment items.

The assessment rubrics provided by the invention may include a criteria rubric, a holistic rubric and a grading rubric. The invention also provides assistance with change management, by allowing for off-line marking through to complete on-line marking. The criteria rubric or criteria highlighter may be printed out in hard copy on a sense sheet for later batch scanning, data capture and reporting. This has an advantage in that data entry can be done on hard copy rather than directly on screen. A criteria highlighter and an embedded XML markup editor can be used off-line via a java marking client. Using this feature of the invention, teachers can provide clear and consistent marking criteria to the assigned markers. A systematic marking process helps to eliminate errors in marking and mark calculations and promotes efficient records capture and archiving.

The feedback management subsystem of the invention may further include

- An interface for students to:
  - Complete unit and teaching reviews related to a unit, course or teacher.
  - File complaints related to, for example, a unit, course or teacher.
  - Launch appeals related to, for example, an assessment item.
  - Request extensions related to, for example, an assessment item.
  - Check the status of their complaints, appeals and extension requests.
  - Set up, modify and view teaching evaluations related to, for example, a unit, course or teacher.
- An interface for teachers to:
  - Provide feedback to students on their assessment status and results, both individual and comparative.
  - Deliver congratulatory messages, warnings and reminders to students.
  - Moderate student assessments, appeals and extension requests.

Another interface may be provided for managers to:

Monitor and manage marking budgets and the marking process.

Mentor teachers and assessors.

Capture and store enterprise intellectual property and corporate knowledge.

Implement unit and teaching evaluations during and at the conclusion of a unit.

The feedback may be facilitated by a comprehensive automatic messaging feature designed for a push model of information delivery concerning assessment and other pre-defined information relevant to students. Communication may occur across intranets and the Internet in multiple languages. The feedback to students, which may be in the form of detailed text, images, audio, and video, may be delivered either on-the-fly or after moderation via email, blog, SMS or any other communication means.

The student-to-teacher feedback feature of the invention enables students to participate to advise teachers of their views. Unit and teaching evaluations may be created and conducted during and at the conclusion of the unit. This feature allows feedback to be collected on the performance of a teacher or unit at anytime, enabling remedial actions to be taken before a unit completes. Students have a clear input into the unit and teachers can respond with an action to address their concerns. In addition, this feature allows complaints, appeals and extension requests to be tracked, analysed and dealt with systematically.

The teacher-to-student feedback feature of the invention enables teachers and assessors to provide high quality and legible comments to students. Comments may indicate the relative performance of the students against the assessment criteria and their relative position as against other students, with or without moderation; explain the justification for a grade and the additional requirement to obtain a higher grade.

The invention may further provide a e-portfolio management subsystem for students and teachers to access and manage their e-portfolios at any time. Student e-portfolios may display information such as their:

Assessment results against the graduate attributes related to a course or unit.

Assessment results against the learning outcomes related to a course or unit.

Assessment submissions and markers' comments.

Attendance records.

Comparative data with the performance of other students. And,

Private reflective diary.

This subsystem helps to trace student development on graduate attributes and learning outcomes over time across the units in the related course. This feature also helps students to market themselves to prospective employers.

Teacher e-portfolios are useful for self-reflection and promotion applications and may display information such as:

Their teaching experiences, as documented in a reflective diary.

The development sequence of a unit over time and how this relates to graduate attributes, learning outcomes and changes in curriculum.

The assessment submissions, comments and results of the units taught.

The attendance records of students. And,

Approvals sought and obtained over time for course and unit changes.

The invention may further provide a reporting subsystem that generates reports in the form of text, audio or video to email accounts, mobile phones and future forms of portable communication devices. Output options can be classified as either individual, relative group or group descriptors. This subsystem enables detailed tracking and reporting of graduate attributes and learning outcomes at an individual student, unit, course, and enterprise levels.

The invention facilitates robust records management and archiving capabilities for quality assurance and accreditation purposes, with systematic management and tracking of:

Feedback from teachers to students and vice versa.

Mapping between graduate attributes and learning outcomes at an individual student, unit, course, and enterprise levels.

Intellectual property such as course learning objects and content, assessment items and answer guides.

Teaching experiences and the amendments made to a unit or course, together with relevant approvals.

Assessment items, marking process and assessment results.

Students' and teachers' performance via their e-portfolios based on graduate attributes, learning outcomes and assessment. And, Students' attendance records.

Comments are electronically stored and archived rather than in the form of handwritten notes, which are kept by students without records capture. This invention will help meet the archival requirements of legislation. Dynamic data collection of student views during a unit enables remedial action to be implemented and reported, rather than just reporting of past events.

This invention is highly flexible and may be used in any learning or evaluation situation involving criterion or performance based assessment. This invention may be used with e-submission processes, print-based submissions, audio or visual presentations, assignments, examination scripts, class participation, class presentations etc, anywhere where criterion or performance based assessment is required with detailed reports. The invention may also be used in any academic discipline at any educational level, as well as in business for the purpose of staff selection, performance evaluation and promotion. The invention provides flexible options for incorporating criterion or performance based assessment in electronic form.

The invention may be integrated with Learning Management Systems (LMS) or with blogs. For instance, it can be embedded within LMS, such as WebCT™, BlackBoard™; Sokai, and Moodle with the availability of relevant API hooks. The invention may be integrated with Student Management Systems (SMS) such as Callista and Peoplesoft. The invention may also provide data storage for plagiarism software detection allowing multiple submissions of data objects.

The invention may have multilingual capabilities. It may be set up in any language and students have the option of selecting a different language for graphical reports. This feature is particularly useful where learning is distributed to varied cultural groups in diverse geographical locations.

In another aspect the invention is computer software to implement the system.

BRIEF DESCRIPTION OF THE DRAWINGS

An example of the invention will now be described with reference to the accompanying drawings, in which.

BEST MODES OF THE INVENTION

Figure 1:
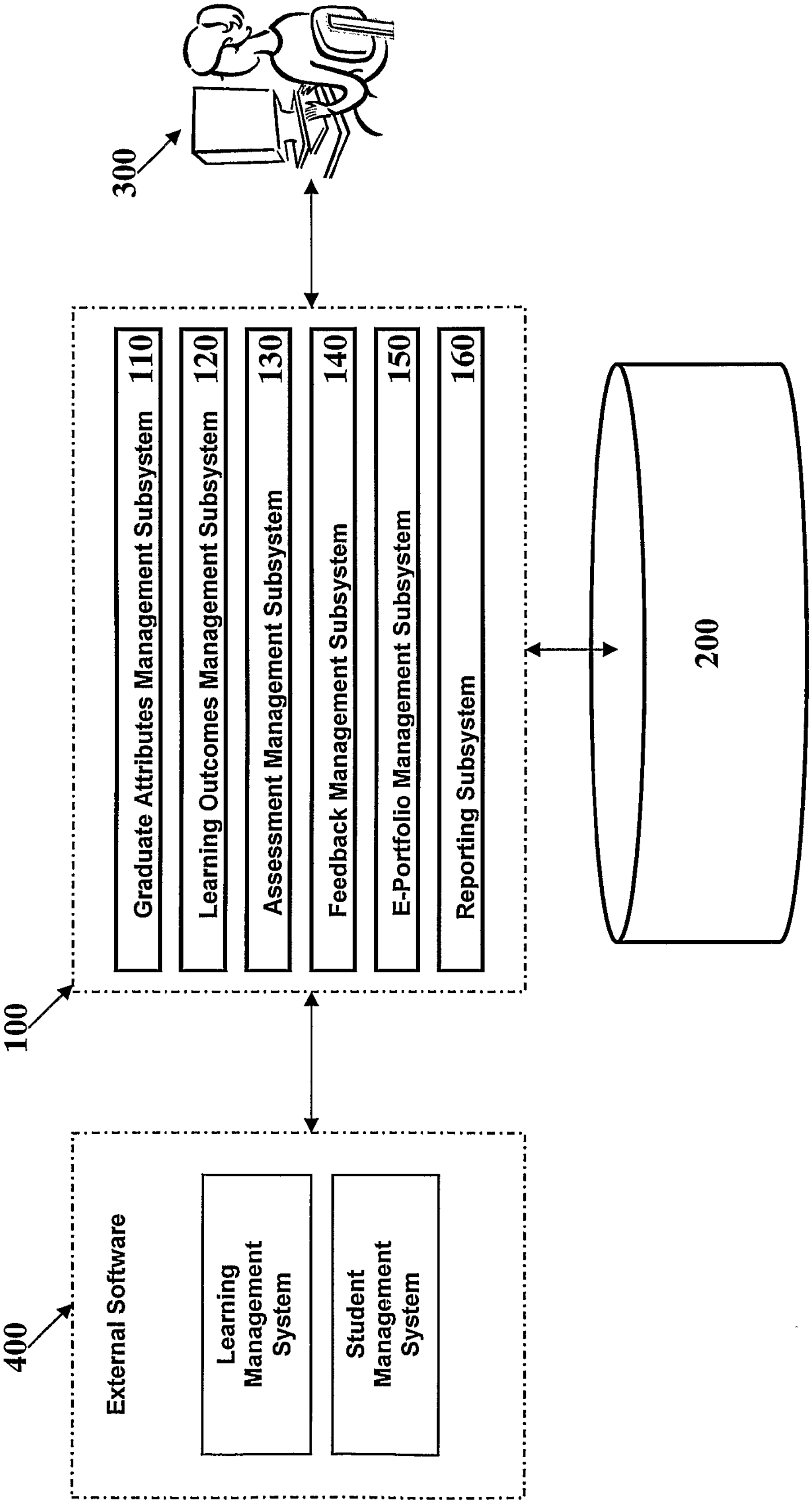
FIG. 1 is a diagram of a typical installation of the invention.

Referring first to FIG. 1, the invention comprises a server 100, database 200 and a web-portal 300 to provide an integrated feedback management system for the assessment of educational services. The invention then interfaces with external software 400 such as Learning Management Systems and Student Management Systems. The server 100 further comprises a number of subsystems.

FIG. 1 also shows a typical architecture of the server 100, which involves the following:

- Graduate attributes management subsystem 110 that manages the relationships between graduate attributes and related teaching methods and assessment items.
- Learning outcomes management subsystem 120 that manages the relationships between learning outcomes and related teaching methods and assessment items.
- Assessment management subsystem 130 that manages all assessment items and the related marking process.
- Feedback management subsystem 140 that manages all forms of communication between the teachers and their students, and vice versa.
- E-portfolio management subsystem 150 that manages the e-portfolios of students and teachers.
- Reporting subsystem 160 that creates and manages reports related to the information stored in the database 200.

The database 200 and subsystems 110, 120, 130, 140, 150 and 160 of the invention will be explained as follows:

Database 200

Figure 2:
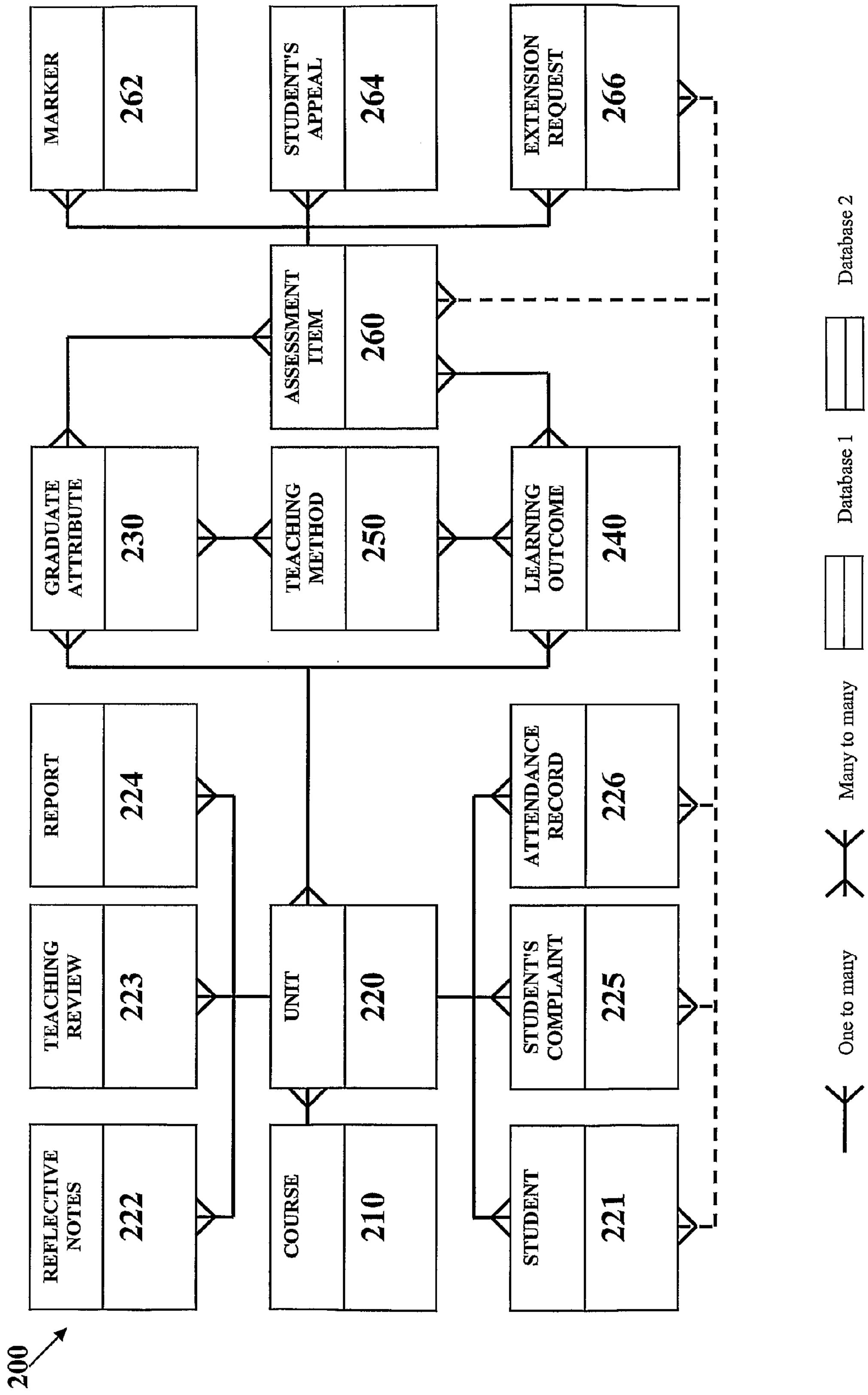
FIG. 2 is a diagram of the typical entities in the database of the invention and their relationships.

Referring to FIG. 2, the typical relationships between the main entities in the database 200 of the invention will involve the following:

A course 210 has one or more units 220.

A unit 220 has a number of entities associated with it, which include:

- One or more graduate attributes 230.
- One or more learning outcomes 240.
- One or more students 221.
- One or more reflective notes 222 on the teaching experience of the teacher.
- One or more unit or teaching reviews 223 completed by the students.
- One or more reports 224 produced using the reporting subsystem 160.
- One or more student complaints and appeals 225 on the unit.
- One or more student attendance records 226.

A graduate attribute 230 related to the unit 220 has:

- One or more teaching methods 250 associated with it, and vice versa.
- One or more assessment items 260 associated with it, and vice versa.

A learning outcome 230 related to the unit 220 has:

- One or more teaching methods 250 associated with it, and vice versa.
- One or more assessment items 260 associated with it, and vice versa.

An assessment item 260 related to one or more graduate attributes 230 and learning outcomes 260 has:

- One or more markers 262 associated with it.
- One or more extension requests 266 associated with it.
- One or more student appeals 264 related to the results of the assessment item.

Appeals may also relate to student teacher interactions or items not selected for assessment.

The relationships between the students 221 and their complaints 225, attendance records 226 related to a particular lecture or tutorial or other attendance requirement, appeals 264 and extension requests 266 are automatically mapped by the database. Attendance records 226 may be entered manually by tutors in the case of physical attendance, or electronically for external attendance. It might be possible to allow students to sign on to tutorial groups up to the maximum allowable for a tutorial group. Failure to attend the required number of tutorials may result in a 'push model' warning through the feedback management subsystem 140.

The assessment items 260 include all items related to an assessment, such as the questions, answers, marker's comments, results and teacher's comments if the results are moderated. Marker's information includes identification of allocated assessments, their hourly rate, allocated budget and time spent on the marking to enable teachers, coordinators and academic supervisors to track marking turnaround.

The database may have the ability to input and output data from external Learning Management System database, for instance, using an API. The database also has the ability to input and output student information such as names, student numbers, email addresses, contact details from external Student Management Systems or Records Management System. If the external databases are Oracle databases, SQL queries can be written. Otherwise, data may be obtained in the form of XML data. This will allow secure and complete integration of the results collation process between the invention and external systems.

The database may store data objects such as student assessment and teacher examination questions for external products such as TurnItIn to determine whether there is plagiarism and prevent reuse of examination questions that contradicts the enterprise policy. Data may be stored using clear document type definitions (XML) and associated integration with other Web 2.0 applications. The invention is both SCORM and IMS compliant.

The database may further store financial information related to a course or unit such as the marking expenses, unit income and unit expenses.

Graduate Attributes Management Subsystem 110

The graduate attributes management subsystem 110 of the invention offers a comprehensive tracking system for graduate attributes for all students, across all units and courses, recognizing acquisition of attributes over time at varying levels of complexity. Systematic identification and tracking of linkages between course structure, unit content, assessment and graduate attributes improves compliance with quality assurance standards significantly. Graduate attribute templates may be adopted, modified or built from scratch.

Figure 3:
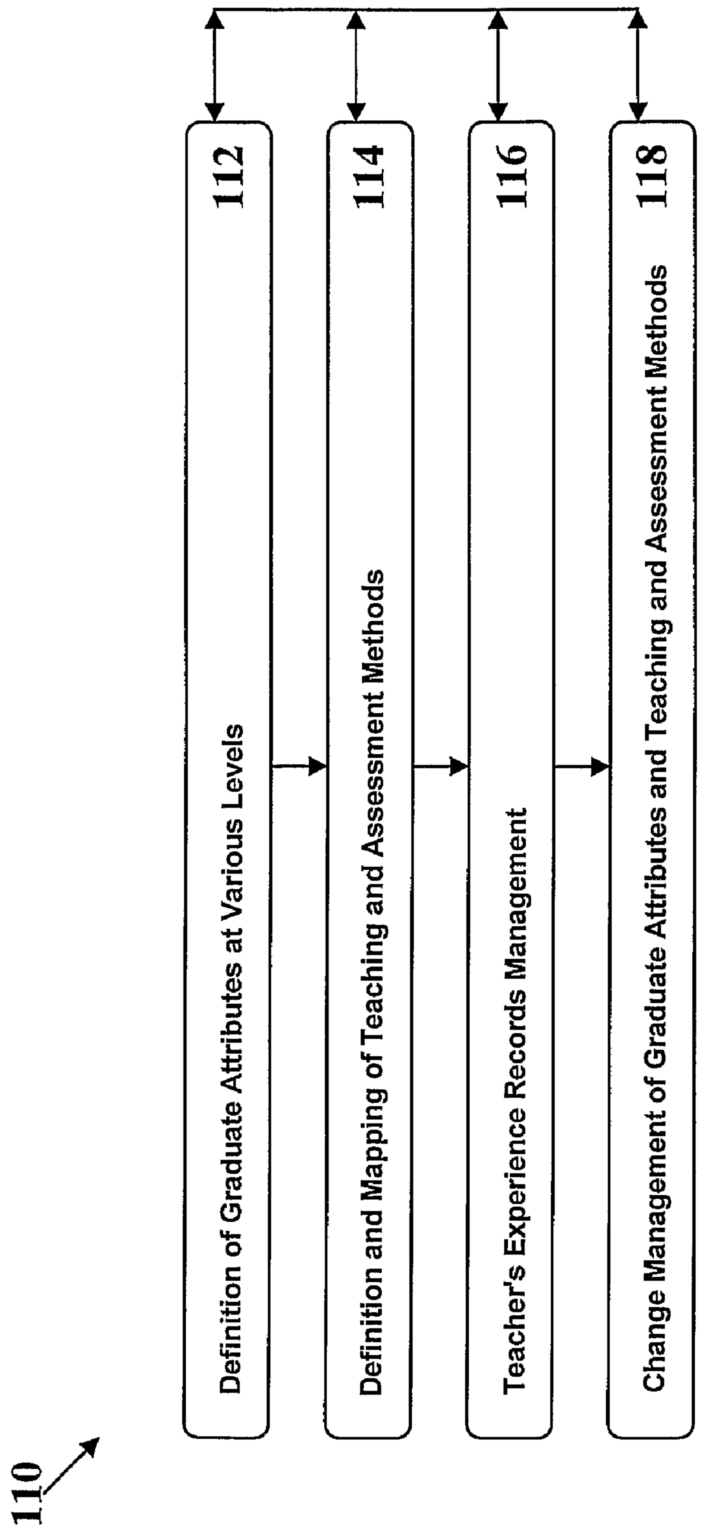
FIG. 3 shows the features of the graduate attributes management subsystem of the invention.

Referring to FIG. 3, graduate attributes management subsystem 110 includes the following features:

- Definition of graduate attributes at various levels 112;
- Definition and Mapping of the related teaching methods and assessment items and methods, both formative and summative, 114;

Teacher's experience records management related to the graduate attributes 116; and Change management of graduate attributes and the related teaching methods and assessment items, including approval records, 118.

The graduate attributes defined at various levels may be saved for future use so that the teachers and coordinators do not have to recreate them for every course and unit.

In addition to defining graduate attributes at different levels of complexity, the attributes may be defined at a number of organisational levels using a graduate attributes definition feature 112. For example, enterprise level graduate attributes may be set by an administrator on a university-wide basis. An example of an enterprise level attribute is graduates having global perspective. Each enterprise level graduate attribute can be broken down into sub-levels if necessary.

Course level graduate attributes are designed to specify and meet accreditation standards. For example an accredited professional qualification may require specific graduate attributes which are not enterprise level graduate attributes. Specification and mapping of course level graduate attributes is an efficient method for proving coverage of accreditation requirements. Alternatively, course level graduate attributes may be agreed upon as necessary for a particular discipline. Graduate attributes at the course level may be set by a course coordinator or an Associate Dean on a course-level basis. Each course level graduate attribute can be broken down into sub-levels if necessary.

Unit level attributes will be set by a unit teacher. An example of a unit level attribute is graduates having demonstrated understanding of the law of negligence. Each unit level graduate attribute can be broken down into sub-levels if necessary.

After the graduate attributes are defined at various organisational levels, teachers can then set up the related teaching and assessment method at all the levels specified using mapping feature 114. For example, a graduate attribute may be mapped to a particular lecture or assessment item. The invention supports both formative and summative assessment types. If a course including a number of units spans over a number of teaching periods, the course coordinator may map the graduate attributes at various levels to the appropriate teaching periods.

Using the teacher's experience records management feature 116, a teacher, for example at a unit level, may record their teaching experience related to the defined graduate attributes, teaching methods or assessment items. This may include adding reflective notes that detail the teaching issues, changes introduced, approvals for those changes and the effectiveness of the changes. This information will be the basis of ongoing improvements and allows new unit teachers to analyse and learn from the experience of past teachers.

Using change management feature 118, a coordinator or teacher, for example at a unit level, will be able to track changes made to the teaching and assessment methods for the defined graduate attributes by recording each developing stage of the methods over the duration of the unit. At the course level, the course coordinator may be able to view a summary of the graduate attributes at all three levels; how they are being taught and assessed; and the assessment outcomes.

Learning Outcomes Management Subsystem 120

Figure 4:
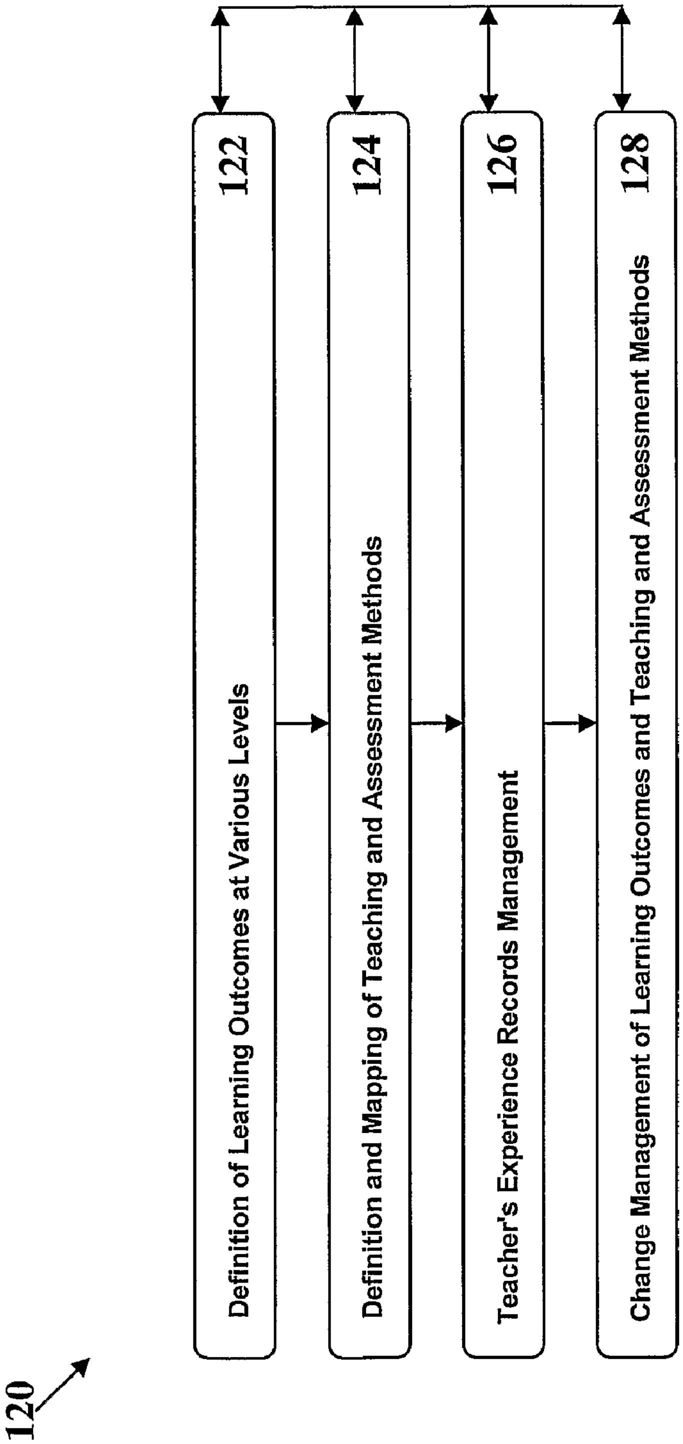
FIG. 4 shows the features of the learning outcomes management subsystem of the invention.

The learning outcomes management subsystem 120 is similar to the graduate attributes management subsystem 110, except that it is linked to common theory constructs. Common theory construct templates may be adopted or modified, and new theory constructs can be build from scratch. Referring to FIG. 4, learning outcomes management subsystem 120 may includes the following features:

Definition of learning outcomes at various levels 122;

Definition and mapping of the related teaching and assessment methods 124;

Teacher's experience records management related to the learning outcomes 126; and Change management of learning outcomes and the related teaching items and methods and assessment items 128.

The learning outcomes defined may be saved for future use so that the coordinators or teachers do not have to recreate them for every course and unit.

Learning outcomes related to a course or unit may be defined using the learning outcomes definition feature 122. The learning outcomes may be defined by the coordinator or teacher, or based on well-known templates. The templates supported by the invention may include:

Biggs SOLO taxonomy;

Bloom's taxonomy of the cognitive domain;

Dave's taxonomy of the psychomotor domain;

Harrow's taxonomy of the psychomotor domain; and

Figure 5:
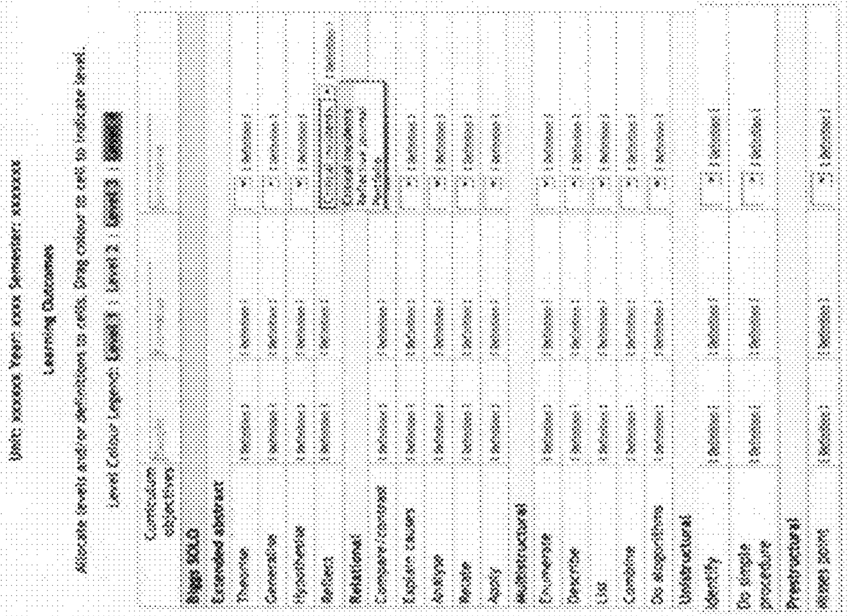
FIG. 5 shows the Biggs' SOLO taxonomy template, an example of the learning outcomes models supported by the invention.

Kathwohl et al taxonomy of the affective domain;

Each learning outcome can be broken down into sub-levels. For instance, there are 5 levels of learning outcomes in the Biggs SOLO taxonomy, as shown in FIG. 5. The levels, pre-structural, uni-structural, multi-structural, relational and extended abstract, capture varying levels of learning outcome complexity. The extended abstract outcome can be further categorised into, for example, theorise, generalise and hypothesise. Each sub-category can be taught and assessed at various levels of complexity, definitions of which are captured and tracked.

Based on the learning outcomes defined, coordinators and teachers can then set up the related teaching and assessment methods using mapping feature 124. For example, a learning outcome may be mapped to a particular lecture or assessment item. If a course including a number of units spans over a number of teacher periods, the course coordinator may map the learning outcomes at various levels to the appropriate teaching periods.

Using the teacher's experience records management feature 126, a teacher, for example at a unit level, may record their teaching experience related to the defined learning outcomes, teaching methods or assessment items. This may include adding reflective notes that detail the teaching issues, changes introduced, approvals for those changes and the effectiveness of the changes. This information will be the basis of ongoing improvements during the course or unit and allows new unit teachers to learn from the experience of past teachers.

Using the change management feature 128, a teacher, for example at a unit level, will be able to track changes made to the teaching and assessment methods for the defined learning outcomes by recording each developing stage of the methods over the duration of the unit. At the course level, the coordinator may be able to view a summary of the learning outcomes at all three levels; how they are being taught and assessed; and the assessment outcomes.

Assessment Management Subsystem 130

Figure 6:
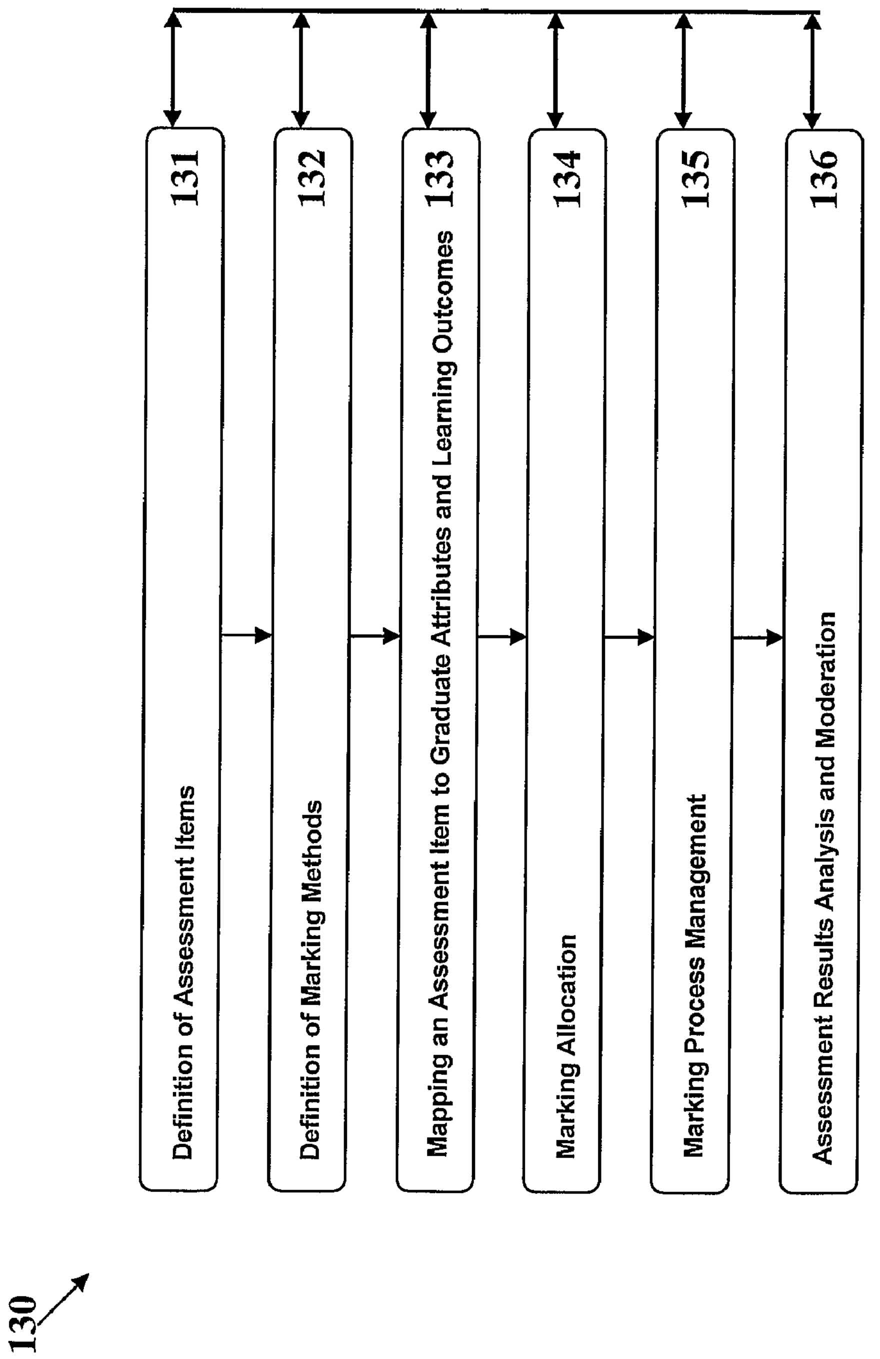
FIG. 6 shows the features of the assessment management subsystem of the invention.

Referring to FIG. 6, the assessment management subsystem 130 may include the following features:

Definition of assessment items that assess attainment of skills, which are related to graduate attributes and learning outcomes, 131;

Definition and selection of assessment rubrics, criteria highlighter and XML markup editor that facilitate the marking process of the assessment items 132;

Definition and mapping of the related graduate attributes and learning outcomes 133;

Allocation of assessment items to markers, and associated tracking, 134;

Management of the marking process 135; and

Management of assessment results 136, as well as reporting of those results.

Assessment items are set up by teachers using the assessment items definition feature 131. Each assessment item contains information such as its title, due date, maximum marks, list of questions, answer guide, lateness penalty method, early bonus method, grading system and the associated tutors and markers. Questions may include a mixture of multi-choice, short answer, essays or any criterion-based assessment. Assessment may be scheduled using a assessment scheduling calendar to automatically define the spacing between assessments.

The types of assessment item supported by the invention may include the following:

Formative assessments, are assessments which serve as practice for more formal work and presentation to help students to progress in their learning, understand and express their learning processes, see the results of their learning to date in relation to particular graduate attributes and learning outcomes, and plan for their improvement and growth.

Summative assessments, which are assessments that serve many of the same functions as formative assessments with the main purpose of "grading" the progress to date in relation to particular graduate attributes and learning outcomes. Examples include all kinds of written assignments, oral presentations and concrete representations of complex ideas.

Setting up assessment items requires entry of general settings followed by adopting a marking method or assessment rubric for each assessment question using the definition and selection feature 132 in FIG. 6. The teacher can either create a new assessment rubric or use a predefined template. Assessment rubrics are used to improve the speed at which assessment can be graded and the quality of the feedback provided to students. The problems of delayed and poor quality feedback are usually the main complaints made by students against the universities they are enrolled in.

The marking methods supported by the invention include:

Criteria rubric, which involves either reading a visual copy of the assessment item on screen or reading a printed copy and then completing the marking grid on screen either at the same time or later. Marks are automatically added.

Criteria highlighter, which involves marking the assessment items based on any number of pre-defined criteria. The criteria highlighter marking method is more useful for very detailed criterion and answer guides than the criteria rubric.

XML marking editor, which is independent of the format of the assessment submission unlike the criteria rubric and highlighter. The criteria rubric and highlighted can also be used in combination with an XML markup editor for use with electronic documents submitted online. Electronic submissions in all formats can be converted to PDF format and marked using the XML marking editor.

Scan-based marking, which enables criteria rubric or criteria highlighter to be printed as a template capable of being scanned. This method enables marks to be recorded on paper and later entered into the database via scanning. The invention allows a criteria rubric or criteria highlighter to be printed out with a barcode to identify each student.

Java marking client, which reproduces the electronic marking feature of invention off-line. The purpose of the Java marking client is to enable data, including electronic assessment items, to be loaded into a laptop. The marking process can be continued even after the laptop is disconnected from the network. When the laptop is reconnected to the network the database 200 of the invention can be updated.

Therefore, the invention provides both online and offline marking methods, or a combination of these approaches. The advantage of this is that the invention allows a staged transition of staff from off-line to on-line marking systems. The development of the criteria rubric can be incorporated into classroom discussion, thereby promoting scholarly critical thinking. Students could be given access to a 'safe version' of the criteria rubric designer, thereby giving students the opportunity to be involved with rubric construction.

After defining the assessment items and related marking methods using features 131 and 132 of the assessment management subsystem 130, a teacher can map an assessment item, or a group of questions within the assessment item, to one or more graduate attributes and learning outcomes using the mapping feature 133. The graduate attributes and learning outcomes may have been mapped to the assessment item using the graduate attributes and learning outcomes management subsystems 110 and 120 but the teacher may redefine the attributes and outcomes that reflect the assessment regime actually taken, at much finer detail if required.

Using the marking allocation feature 134 of the assessment management subsystem 130, a teacher may allocate one or more questions of an assessment item to individual markers. The invention also allows the teacher to allocate the assessment items of a group of students to the individual markers. The allocated questions, hardcopy or softcopy, will be given to the designated markers. A dateline, remuneration rate and budget may be set for the markers, which the teacher may use to track the time required to mark the assessment items and the associated costs. Course coordinators and other administrative officers also have access to this information.

Once the markers have been assigned, they can mark the assessment items allocated using the marking feature 135 of the assessment management subsystem 130. The markers will mark the assessment items using the marking method selected by the teacher. The invention also allows pre-defined comments to be set by the teachers to ensure consistency in the comments given for the same mistakes. Comments may be given in text, audio, image and video format. Comments may also be rated on a negative to positive scale, a report for which may be used for mentoring markers.

Once the marking process completes, the teacher and course coordinator may analyse the results using the assessment results and moderation feature 136 in FIG. 6. The results may be moderated if necessary. The feature may allow several moderation settings, including:

Multiple markers same question, where the moderator may force mean and standardisation equalisation for multiple markers for the same question.

Multiple markers different questions, where the moderator may force mean and standardisation equalisation for multiple markers for the different questions Final result moderation, where the moderator may alter the cutoff points for the awarded grades, alter the awarded grades manually or increase the standard deviation.

Once the assessment process completes, the teacher and course coordinator may create various reports on the outcomes of an assessment item and how they are mapped to the graduate attributes and learning outcomes. This feature allows the teacher and course coordinator to analyse the effectiveness of their unit or course and improve them accordingly. Students will be notified of their assessment results via the feedback management subsystem 140 of the invention. Feedback may be in the form of text, image, audio and video.

Feedback Management Subsystem 140

Figure 7:
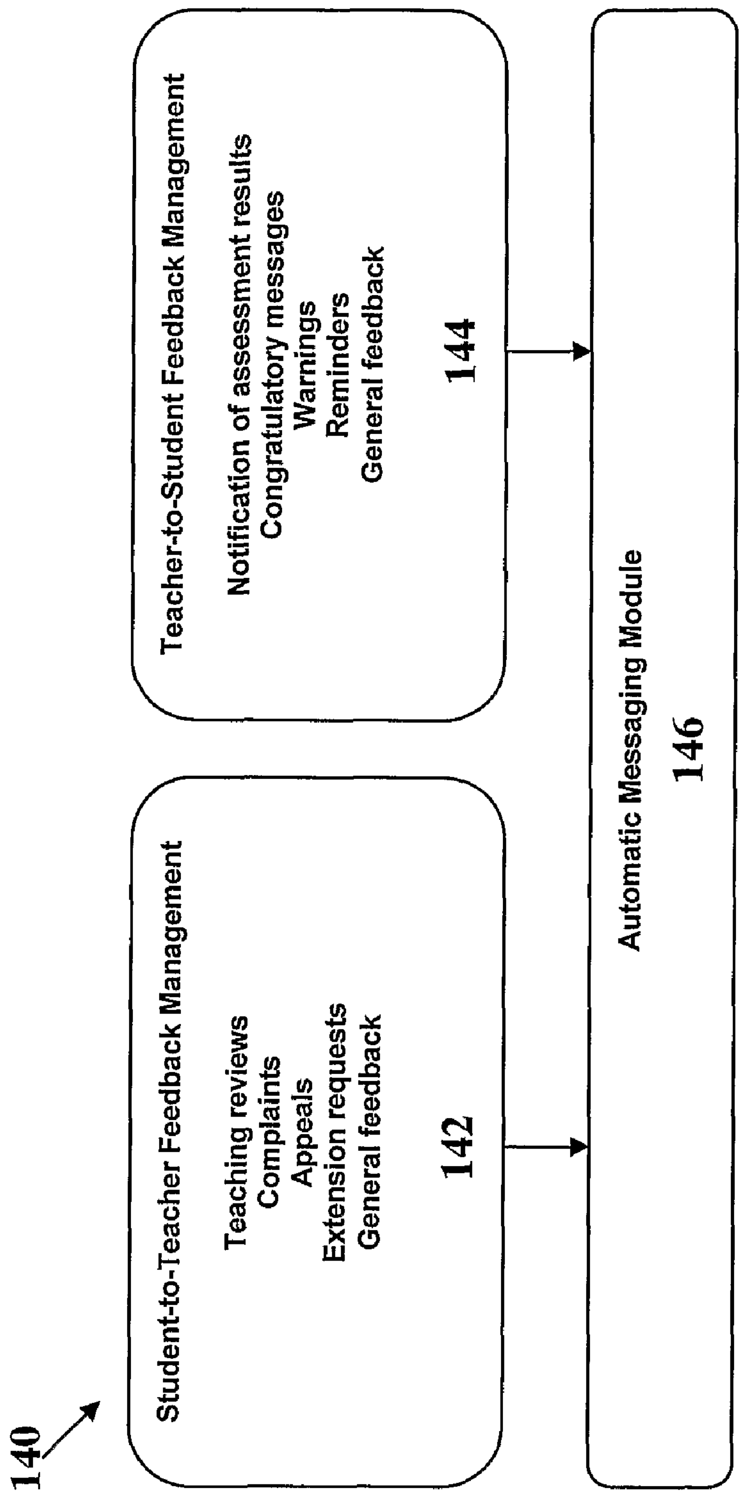
FIG. 7 shows the features of the feedback management subsystem of the invention.

The feedback management subsystem 140 of the invention handles all forms of communication between a teacher, a course coordinator and the students of the unit or course. Referring to FIG. 7, the feedback management subsystem 140 may include the following features:

- Student-to-teacher feedback management 142, which lets students to:
  - Complete teaching reviews related to a unit, course or teacher.
  - File complaints related to a unit, course or teacher.
  - Launch appeals related to, for example, an assessment item.
  - Request for extension related to, for example, an assessment item.
  - Monitor the status of the complaints, appeals and extension requests.
- Teacher-to-student feedback management 144, which lets teachers to:
  - Deliver comments on assessment status and results to students.
  - Deliver congratulatory messages, general enquiries, warnings and reminders to students.
  - Review the teaching and unit reviews completed by the student and introduce continual improvement on the unit or course during the unit or course and provide an appropriate response to students.
  - Receive automatic notification of the complaints, appeals and extension requests submitted by the students and act on them accordingly.

Teachers may create teaching evaluations related to a course, unit or teacher from scratch or based on existing templates. The teachers may choose to commence the teaching evaluations immediately or schedule them for a later date. Once a teaching evaluation commences, an email will be sent to students enrolled in, for example, a unit, directing them to the web-based teaching evaluation form. The system will generate an acknowledgement to the students once the web form has been completed and submitted. The data will then be added to the database from which the response statistics, graphs and other output may be generated. The response rate of the evaluations may be indicated and when necessary, the feature may alert the teachers of the low response rate. The results of the teaching evaluations may then be released by the teacher before or after all feedback is gathered. Based on the feedback obtained, teachers may introduce continual improvements to, for example, a unit.

Students can lodge complaints using a web-based complaint form. The complaint form may be sent to the unit teacher or Head of School, or appropriate officers specified by enterprise policy, who will investigate the complaint and discuss with the student accordingly. Students can also lodge an appeal with regards to an assessment item. An automatic message will be sent to the unit teacher, Head of School or other appropriate officer, who will decide on the appeal and notify the student accordingly. Students should be able to track the progress of their complaints and appeals. Similarly, students can request for assessment extensions via a web-based assessment extension form. They need to specify their reasons, which may be supported with evidence. The request will be sent to the Unit coordinator, or other, who will decide on the request and notify the student accordingly.

Notification of assessment results and answer guides will be sent to the students when the marking process completes. The teacher may have the results moderated before the notification process begins. In addition, the unit teacher may send students congratulatory messages if they score higher than a pre-defined mark. Warnings about plagiarism and lateness may also be sent to students. Students may reply to the teacher's messages and provide some feedback to the teacher about the unit.

The feedback may be facilitated by a comprehensive automatic messaging module 146 designed for a push model of information delivery concerning assessment and other pre-defined information relevant to students. Communication may occur across intranets and the Internet in multiple languages. The feedback to students, which may be in the form of detailed text, images, audio, and video, may be delivered either on-the-fly or after moderation via email, SMS or any other communication means.

The automatic messaging feature 146 may also further provide an automatic messaging calendar that allows teachers to schedule the messages, in the form of text, audio, image or video, to be sent to students. Teachers may also save standard messages as templates for future use. Messages may be set to recur every pre-defined period. Automatic messaging can be created, for example, to congratulate students on their improvement on an attribute or learning outcome over time. The automatic messaging feature may also automatically trigger academic supervisors when late assignments are handed in beyond the dateline.

E-Portfolio Management Subsystem 150

The e-portfolio management subsystem 150 of the invention manages:

Student e-Portfolios related to student assessment submissions and results associated with the graduate attributes and learning outcomes defined for a course or unit;

Teacher e-Portfolios related to the teacher's teaching experience documented in their reflective notes, development of their units over time and performance of students with respect to graduate attributes and learning outcomes defined for a course or unit a teacher has taught.

Student e-portfolio should be accessible by an individual student at any point in their degree, and after graduation, and will be based on the units they have completed. The student e-portfolio may also be accessible by teachers and course coordinators and heads of school. The e-portfolios allows students to identify their achievement on attributes and learning outcomes, which may lead to remedial strategies on an individual basis. The student may also trace his/her development on attributes and learning outcomes over time across units.

Skill profile and information related to the development of a student may be linked a portfolio of their work and comparative data with the performance of other students. This information would be useful for the student to market their graduate attributes and learning outcomes to prospective employers. Student e-portfolios may also include a private reflective diary and a personal website for community building. Student e-portfolio may also include a photograph of the student linked to student's personal information.

A teacher e-portfolio may outline the development of the units taught by the teacher over time, approvals for changes, effectiveness of the changes introduced and how the changes related to the graduate attributes and learning outcomes. Teachers can compare their own performance on a year-by-year basis and this information is also useful for promotion applications. Teacher e-portfolios may further include a summary of the teaching reviews received from students. A teacher e-portfolio is available for access while employed at an enterprise and while also employed at another enterprise that uses the system.

Reporting Subsystem 160

The Reporting subsystem 160 allows coordinators to generate various reports related to the performance of students, teachers and markers. Reports may be sent as email attachments, sound reports, video reports or text messages to mobile phones or future forms of portable communication devices. The reporting subsystem 160 may provide an option to keep the identity the students involved anonymous.

Report recipients may also access their reports via a web interface or the enterprise's Learning Management System. For example, a student may access their assessment report by logging onto the system to retrieve the report. The student may see the percentage of the assessment submissions marked, even if their individual assessment has not been marked.

Report options may be classified as:

- Individual descriptors, which provide reports on, for example, the performance of an individual student, teacher or marker. For example, a student may view their performance
- Relative group descriptors, which provide reports on, for example, the assessment result of a student, teacher or marker relative to their peers.
- Group descriptors, which provide reports on a group of students, teachers or markers as a whole.

The reports may be produced in a number of formats, such as spider or radar graph, bar chart, line graph, box plot, scatter plot and marked up histogram. Examples of reports that may be produced by the reporting subsystem 160 include:

- Assessment results in relation to the graduate attributes and learning outcomes defined for a course or unit;
- Attendance records for a tutorial, lecture or practice group;
- Mentoring report that displays how positive or negative markers are in their marking in relation to the assessment criteria of an assessment item;
- Assessor marking profile report that displays the costs associated with the marking of an assessment item or all assessment items of a unit or course.
- Teaching reviews report that summarise the feedback of students in relation to a course or unit.
- Attrition report on student enrolments.
- Course or unit final results for preparation of grades or to determine course completion and eligibility for graduation.

Although the invention has been described with reference to a particular example, it should be appreciated that many variations and alternatives will fall within the scope of the same invention. For instance, the invention may be applied to assessment of other services as well as educational services.

Many additional features may also be included, for instance an evaluation subsystem.

The invention claimed is:

1. A web-based system comprising a server, database and a web-portal to provide an integrated feedback management system for the assessment of educational services, comprising:

an interface to:
- input definitions of graduate attributes at various levels of complexity;
- input definitions of learning outcomes related to teaching theory at various levels of complexity;

a database to map relationships between:
- graduate attributes at particular levels of complexity and their related teaching methods and assessment items;
- learning outcomes at particular levels and their related teaching methods and assessment items;

a processor to:
- automatically respond to the assessment results for a particular student and determine and record both the graduate attribute levels of complexity, and learning outcomes levels, achieved by that student.

2. The system claimed in claim 1, further comprising:

a database to store:
- teaching experiences related to graduate attributes and learning outcomes;
- student feedback related to courses, or course units;

a processor to:
- map changes to teaching and assessment methods, both formative and summative, related to information in the database.

3. The system claimed in claim 2, further comprising:

an interface for teachers to:
- set up assessment items, which contain information such as the title, due date, maximum marks, list of questions, answer guide and grading system;
- map assessment items to relevant graduate attributes and learning outcomes;
- input definitions of assessment rubrics, assessment criteria highlighter and XML markup editor to be used for commenting and grading assessment items; and,
- allocate and track assessment items, or a group of questions within the assessment items, to one or more markers.

4. The system claimed in claim 3, further comprising:

An interface for markers to:
- assess the assigned assessment items using assessment rubrics, assessment criteria highlighter and XML markup editor determined by the teacher;
- input comments, in text, audio, image and video format, to students; and,
- record the assessment results of the assigned assessment items.

5. The system claimed in claim 4, further comprising means to allow off-line marking through to complete on-line marking.

6. The system claimed in claim 1, further comprising:

an interface for students to:
- complete unit and teaching reviews related to a unit, course or teacher;
- file complaints related to a unit, course or teacher;
- launch appeals related to an assessment item;
- request extensions related to an assessment item;
- check the status of their complaints, appeals and extension requests;
- set up, modify and view teaching evaluations related to a course or teacher; and, an interface for teachers to:
- provide feedback to students on their assessment status and results, both individual and comparative;
- deliver congratulatory messages, warnings and reminders to students;
- moderate student assessments, appeals and extension requests.

7. The system claimed in claim 1, further comprising:

an interface for managers to:
- monitor and manage marking budgets and the marking process;
- mentor coordinators and assessors;
- capture and store enterprise intellectual property and corporate knowledge; and, implement unit and teaching evaluations during and at the conclusion of a unit.

8. The system claimed in claim 1, further comprising a comprehensive automatic messaging feature designed for a push model of information delivery concerning assessment and other pre-defined information relevant to students.

9. The system claimed in claim 1, further comprising an e-portfolio management subsystem for students and teachers to access and manage their e-portfolios at any time.

10. The system claimed in claim 9, further comprising a student e-portfolios to display the following student information:

assessment results against the graduate attributes related to a course or unit;

assessment results against the learning outcomes related to a course or unit;

assessment submissions and markers' comments;

attendance records;

comparative data with the performance of other students; and private reflective diary.

11. The system claimed in claim 1, further comprising teacher e-portfolios for self-reflection and promotion applications and which display the following information:

teaching experiences, as documented in a reflective diary;

the development sequence of a unit over time and how this relates to graduate attributes, learning outcomes and changes in curriculum;

the assessment submissions, comments and results of the units taught;

the attendance records of students; and, approvals sought and obtained over time for course and unit changes.

12. The system claimed in claim 1, further comprising a reporting subsystem that generates reports in the form of text, audio or video to email accounts, mobile phones and future forms of portable communication devices.

13. The system claimed in claim 1, wherein the system is integrated with a Learning Management System.

14. The system claimed in claim 1, further comprising multilingual capabilities.

15. Computer software to implement the system according to any preceding claim.

16. The system claimed in claim 1, further comprising an assessment results and moderation functionality to provide one or more of the following moderation settings:

a first moderation setting, where the moderator operates to force mean and standardisation equalisation for multiple markers for the same question;

a second moderation setting, where the moderator may force mean and standardisation equalisation for multiple markers for different questions; and a final result moderation setting, where the moderator may alter the cutoff points for the awarded grades, alter the awarded grades manually or increase the standard deviation.

17. The system claimed in claim 1, further comprising an assessment results and moderation functionality to provide one or more of the following moderation settings:

a first moderation setting, where the moderator operates to force or move towards equalisation of measures of central tendency, measures of dispersion, and measures of skewness for multiple markers for the same question;

a second moderation setting, where the moderator may force or move towards equalisation of measures of central tendency, measures of dispersion, and measures of skewness for multiple markers for different questions;

a third moderation setting, where the moderator may change marks for individual assessment submissions or groups of assessment submissions within a range of marks or range of percentage levels of achievement;

a fourth moderation setting, where the moderator may standardise assessment submission marks or grades, or both marks and grades;

a final result moderation setting, where the moderator may alter cutoff points for awarded grades, alter the awarded grades manually or alter the dispersion or skewness of awarded grades.

* * * * *